Patented July 9, 1946

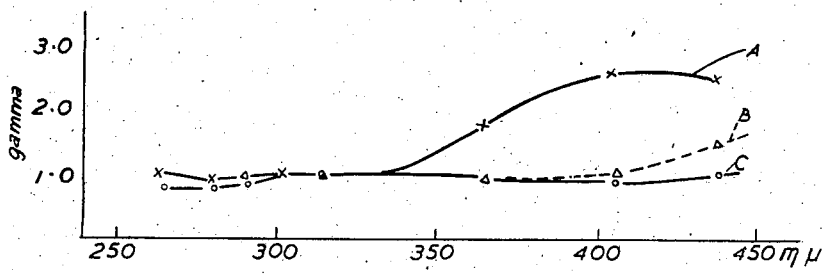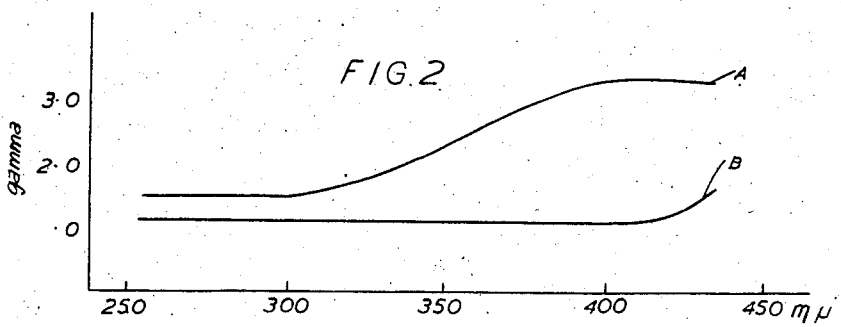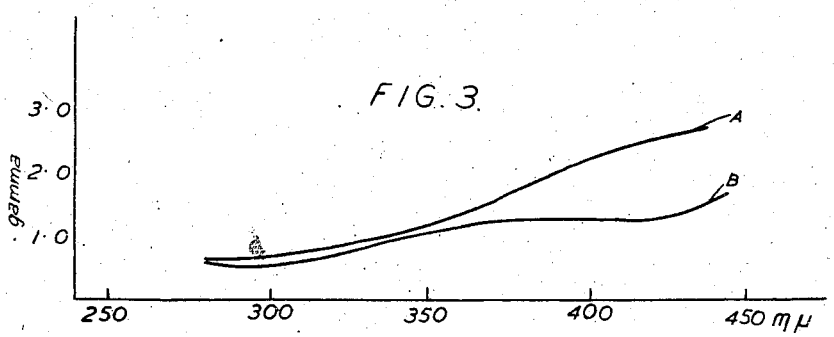

2,403,708

UNITED STATES PATENT OFFICE 2,403,708

SENSITIVE PHOTOGRAPHIC MATERIALS

Edward Philip Davey and Edward William Herbert Selwyn, Wealdstone, Harrow, England, assignors to Eastman Kodak Company, Rochester, N. Y., a corporation of New Jersey Application August 8, 1944, Serial No. 548,558
In Great Britain August 10, 1943

8 Claims. (Cl. 95—7)

This invention relates to photographic sensitive silver halide emulsions.

It is known that with practically all sensitive silver halide emulsions, the gamma (which is a measure of contrast made on the well-known characteristic H & D curve) is not the same for constant development at all wavelengths to which the emulsion is sensitive. Thus most non-colour sensitised emulsion layers have a gamma which is about 1.0 between 250 and about 320 m$\mu$ and rises steadily from about 320 upwards, till it reaches a maximum. This inconstancy of gamma with wavelength is a serious drawback for some spectrographic purposes. The gamma referred to is that commonly obtained in practice which is almost the maximum gamma obtainable in most ordinary developers.

It is possible to coat an emulsion as a very thin layer and obtain thereby a much more constant gamma over the waverange 250 to 450 m$\mu$ than if the emulsion were coated more thickly as is usually done in most commercial materials. Such thinner coating however causes a considerable lowering throughout the wavelength range of the maximum density obtainable which is a great disadvantage in spectroscopy. It is also possible to start with an emulsion giving a very low natural contrast since then the gamma does not rise so much from about 320 upwards but such emulsions are usually very grainy if they are made sufficiently sensitive to permit of short exposure.

According to the present invention the gamma in the range from about 350 to 400 is reduced without greatly reducing the gamma in the range 250 to about 350 m$\mu$ by incorporating diffusely in the emulsion layer a substance which does not sensitise the emulsion and for all practical purposes has no deleterious action on the emulsion but having an absorption maximum lying between 350 and 400 m$\mu$ and a lesser absorption from 350 m$\mu$ downwards to 280 or better to 250 m$\mu$. Such a substance is p-nitraniline. Other examples are m-nitraniline and aesculin. These substances may be added in alcohol or water solution. Preferably such substances are added to the emulsion before coating but may be incorporated by bathing the coated emulsion in a solution thereof. In the case of p-nitraniline the amount used should preferably be between 0.5 and 2.0 grams per litre of wet emulsion or 5–20 grams per 1000 cc. in the dry layer.

To obtain the best results the said substance should be of such character and in such concentration that the light absorption given thereby when measured as density in a gelatine layer of a thickness and concentration equal to that of the gelatine of the emulsion layer is, after correction for absorption of the gelatine itself, at each wavelength between 250 and 400 m$\mu$, of a positive value between $$1.5\left(\frac{1}{X_3}-\frac{1}{X}\right)-0.3$$

and $$4\left(\frac{1}{X_3}-\frac{1}{X}\right)+0.3$$

where $X$ is the gamma at such wavelength of the emulsion not containing said substance, and $X_3$ is the gamma at the wavelength 300 m$\mu$, the gammas being measured as herein set forth.

The gamma is to be measured as 0.9 of the maximum gamma measured as the average between densities of 0.3 and 1.5 when the layer is developed at 65° F. in the following developer:

| | |
|---|---|
| Metol | grams__ 0.73 |
| Hydroquinone | do____ 2.9 |
| Sodium sulphite (anhydrous) | do____ 24.0 |
| Sodium carbonate (anhydrous) | do____ 16.0 |
| Potassium bromide | do____ 1.3 |
| Water to make | litres__ 1 |

We may also incorporate diffusely in the emulsion layer a yellow dye which absorbs relatively strongly between 400 and 500 m$\mu$ and is relatively of low absorption between 280 and 330 m$\mu$ such as tartrazine or naphthol yellow or auramine, in order to reduce the gamma between the wavelengths 450 to 500 m$\mu$.

Where we say that the substance is one which for all practical purpose has no deleterious action on the emulsion, we mean that it does not fog the emulsion nor crystallise out in it when kept under normal conditions and does not desensitise it over the range 280 to 450 more than about 30% calculated on the H and D speeds at these wavelengths.

Example I

A mediumly fast silver iodobromide emulsion containing in a litre, an amount of 70 grams of gelatine and silver iodobromide equivalent to 40 grams of silver nitrate was divided into three portions, to two of which was added p-nitraniline in the proportion of 0.07 gram per 100 ccs. of emulsion, and to one of these two, there was added tartrazine in the proportion of 0.15 gram per 100 ccs. The three portions were coated, each at the rate of about 20 grams of emulsion (containing the equivalent of 0.8 gram of silver nitrate) per square foot. The gamma plotted against wavelength for each portion is shown in Figure 1 of the drawing accompanying this specification where curve A is for the portion free from the p-nitraniline and free from tartrazine, curve B is for the portion containing the p-nitraniline and curve C is for the portion containing both the p-nitraniline and tartrazine.

In this example the p-nitraniline base was employed but if desired a salt may be used such as the hydrochloride since this is more soluble in water than is the base. It is an advantage to make the pH of the emulsion 6.5 or less as this reduces any tendency for the p-nitraniline to crystallise, especially if the base is employed.

*Example II*

To one litre of a silver bromide emulsion, at a pH of 6.5 (at 35° C.) and containing 50 grams of gelatine and an amount of silver bromide equivalent to 57 grams of silver nitrate, there was added the following solution of p-nitraniline; a solution of 1.5 grams of p-nitraniline in 100 ccs. of ethyl alcohol was added to 100 ccs. of water containing 0.9 ccs. of ordinary concentrated hydrochloric acid. The silver bromide emulsion with such addition, was then coated as a layer on glass so that 1 square foot contained the equivalent of 0.3 grams of silver nitrate. The gammas plotted against wavelength are shown in Figure 2 of the drawing accompanying this specification, in which curve A is for the emulsion before the p-nitraniline was added and curve B for the emulsion containing the p-nitraniline.

*Example III*

To one litre of a silver bromide emulsion at a pH of 7.0 (at 35° C.) and containing 60 grams of gelatine and an amount of silver bromide equivalent to 57 grams of silver nitrate, there was added a solution of 2 grams of m-nitraniline in 100 ccs. of ethyl alcohol. The silver bromide emulsion with such addition was then coated as a layer on glass so that 1 square foot contained the equivalent of 0.6 gram of silver nitrate. The gammas are shown in Figure 3. As in Example 2, the curve A is for the emulsion before the m-nitraniline was added and curve B for the emulsion containing the m-nitraniline.

We claim:

1. A light-sensitive silver halide emulsion layer diffusely containing a nitraniline selected from the group consisting of p-nitraniline and m-nitraniline which does not sensitise the emulsion and for all practical purposes has no deleterious action on the emulsion but having a light absorption maximum lying between 350 and 400 m$\mu$ and a lesser absorption from 350 m$\mu$ to 250 m$\mu$.

2. A light-sensitive silver halide emulsion layer diffusely containing a nitraniline selected from the group consisting of p-nitraniline and m-nitraniline in such concentration that the light absorption given thereby when measured as density in a gelatine layer of a thickness and concentration equal to that of the gelatine of the emulsion layer is, after correction for absorption of the gelatine itself, at each wavelength between 250 and 400 m$\mu$, of a positive value between $$1.5\left(\frac{1}{X_3}-\frac{1}{X}\right)-0.3$$

and $$4\left(\frac{1}{X_3}-\frac{1}{X}\right)+0.3$$

where X is the gamma at such wavelength of the emulsion not containing said substance, and $X_3$ is the gamma at the wavelength 300 m$\mu$.

3. A light-sensitive silver halide emulsion according to claim 2 in which the said substance is p-nitraniline.

4. A light-sensitive silver halide emulsion containing between 0.5 and 2.0 grams of p-nitraniline per litre of the wet emulsion.

5. A light-sensitive silver halide emulsion according to claim 1, diffusely containing also a yellow coloured substance which has a light absorption maximum lying between 500 and 400 m$\mu$.

6. A light-sensitive silver halide emulsion layer containing a nitraniline selected from the group consisting of p-nitraniline and m-nitraniline and having a substantially constant gamma between wavelength 280 and 440 m$\mu$.

7. A light sensitive silver halide emulsion layer containing a nitraniline selected from the group consisting of p-nitraniline and m-nitraniline and having a substantially constant gamma between wavelength 250 and 400 m$\mu$.

8. A light-sensitive silver halide emulsion layer diffusely containing from 5 to 20 grams per 1000 cc. of dried emulsion of a nitraniline selected from the group consisting of p-nitraniline and m-nitraniline.

EDWARD PHILIP DAVEY.
EDWARD WILLIAM HERBERT SELWYN.